Dec. 12, 1939.   J. GRÜNSCHNEDER   2,183,397
DYNAMO-ELECTRIC MACHINE
Filed April 28, 1938

Inventor:
Johann Grünschneder,
by *Harry E. Dunham*
His Attorney.

Patented Dec. 12, 1939

2,183,397

UNITED STATES PATENT OFFICE 2,183,397

DYNAMO-ELECTRIC MACHINE

Johann Grünschneder, Berlin-Charlottenburg, Germany, assignor to General Electric Company, a corporation of New York Application April 28, 1938, Serial No. 204,901
In Germany May 21, 1937

6 Claims. (Cl. 171—227)

My invention relates to dynamo-electric machines, and more particularly to an improved construction of a magnetic field excitation system for generators adapted to operate under widely varying operating conditions.

Certain types of generators are arranged to be connected to supply power under various operating conditions and to maintain a voltage within predetermined limits for these various operating conditions. In certain instances such generators are arranged to supply a main load at a given speed and to supply a relatively small auxiliary load at a different operating speed and yet maintain the voltage of the generator within a predetermined range. In such generators it is desirable that the magnetic circuit should be maintained substantially saturated in order to obtain a stable operation of the machine under the different operating conditions.

An object of my invention is to provide an improved generator magnetic field excitation system.

Another object of my invention is to provide a generator magnetic field excitation system which will maintain substantial saturation of the magnetic field circuit under various predetermined different operating conditions in order to maintain stable operation of the generator under these different conditions.

Further objects and advantages of my invention will become apparent and my invention will be better understood from the following description referring to the accompanying drawing, and the features of novelty which characterize my invention will be pointed out more particularly in the claims appended to and forming a part of this specification.

Figure 1:
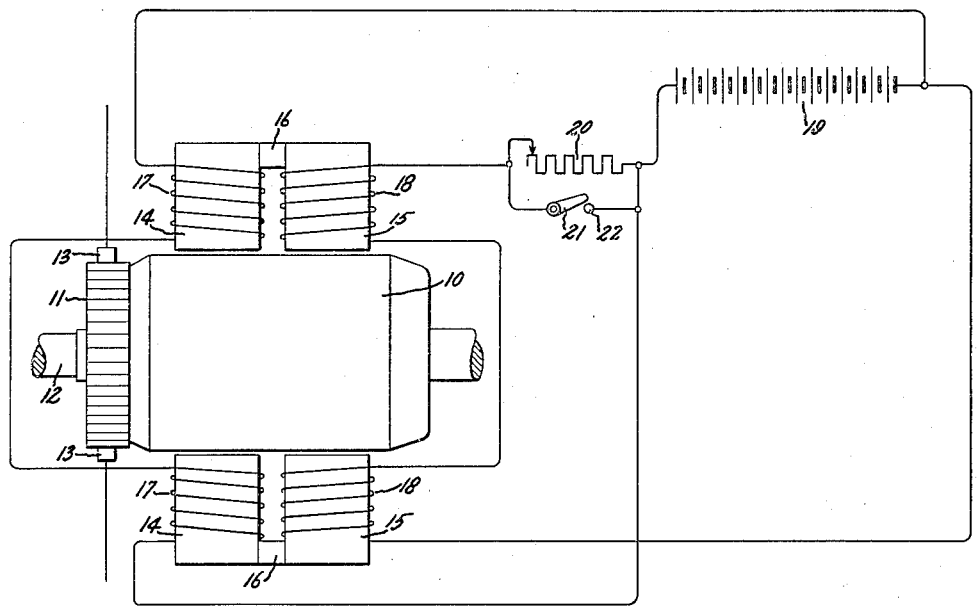
Figure 2:
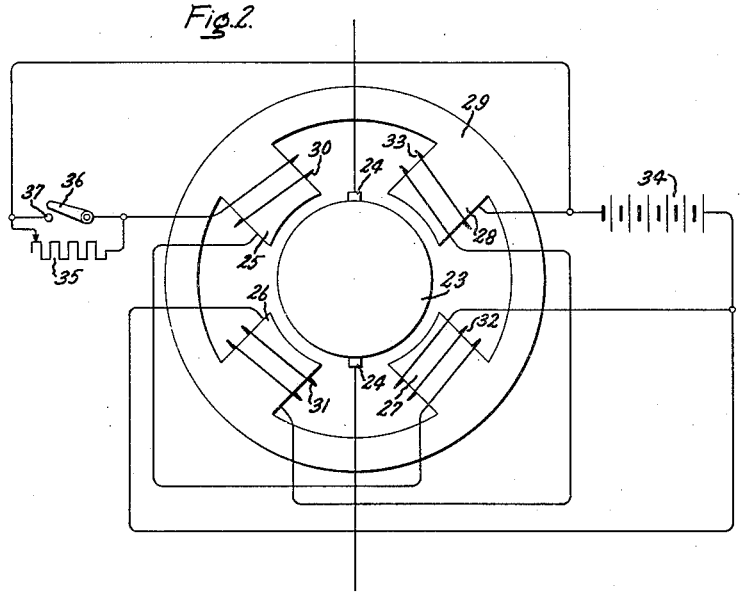

In the drawing, Fig. 1 is a schematic diagram of a generator provided with a magnetic field excitation system having longitudinally spaced-apart pole pieces arranged in accordance with my invention, and Fig. 2 is a schematic diagram of the generator provided with a field excitation system arranged in accordance with another embodiment of my invention.

Referring to the drawing, the embodiment of my invention shown in Fig. 1 comprises a rotatable member or armature 10 of an electric generator having a suitable winding connected to a commutator 11 and mounted upon a shaft 12. The electrical load is connected to the generator by a set of brushes 13, and the desired excitation is provided by a stationary member having a plurality of magnetic poles, each comprising a pair of longitudinally spaced-apart pole pieces 14 and 15. These pole pieces are connected together by a supporting frame 16 of magnetic material, and are excited by field windings 17 and 18 arranged to saturate substantially magnetically the pole pieces 14 and 15, respectively. The field exciting windings 17 are connected in series and are arranged to be energized by connection across a substantially constant potential source of electrical power supply, such as an electrical battery 19. The field exciting windings 18 also are connected in series and across the substantially constant potential battery 19 and in series with a high resistance 20. A shunting switch provided with a contactor 21 and a contact 22 is connected across the resistance 20, so that the field exciting windings 18 may be connected directly across the terminals of the battery 19 by closing this switch.

Under light load or low speed conditions the contactor 21 is closed in engagement with the contact 22 and all of the field exciting windings 17 and 18 are fully energized, so that the pole pieces 14 and 15 are excited substantially to saturation and the voltage of the generator varies in accordance with its inherent characteristics as determined by the saturated portion of its magnetization curve and electrical load. When the main load is connected to the generator, the speed at which a prime mover will drive the generator generally is higher than the speed under light load conditions. In order to maintain the terminal voltage of the generator within a predetermined range and yet obtain a stable operation of the machine, it is desirable that the magnetic field exciting system should remain substantially saturated. In order to maintain a substantially saturated magnetic field excitation system and to maintain the voltage of the generator within a predetermined range, the pole pieces per pole which are excited substantially to saturation are varied uniformly depending upon the operating load and operating speed of the generator. To obtain this result, the field exciting windings 18 are connected in series with the high resistance 20 by opening the contacts 21 and 22 and are thereby substantially deenergized when the speed of the generator is increased due to a change in load. This, however, has substantially no effect upon the excitation of the pole pieces 14 which remain substantially saturated by the normal energization of the field exciting windings 17. Under light loads when the generator is operating at a higher speed, all of the field exciting windings are energized by closing the contacts 21 and 22 of the shunting switch so as to connect the field exciting windings 18, as well as the field exciting windings 17, across the battery 19. The field exciting windings 17 and 18 are constructed so that the voltage of the generator can be maintained within a desired predetermined range under the different operating conditions. Furthermore, the desired voltage limits for excitation by both the sets of field exciting windings 17 and 18 and for excitation by only one set of field exciting windings 17 may be maintained substantially the same for both conditions, or any other desired predetermined relative voltages for the different operating conditions may be obtained by varying the relative excitation provided by the two sets of pole pieces.

In the modification of my invention shown in Fig. 2 an electrical generator is provided with a rotatable member or armature 23 to which an electrical load may be connected through a set of brushes 24. The excitation of the generator is provided by a stationary member having a plurality of magnetic poles including a plurality of circumferentially spaced-apart pole pieces 25, 26, 27, and 28. These pole pieces are mounted on a supporting frame 29 of magnetic material and are excited by field exciting windings 30, 31, 32, and 33, respectively, arranged so that pole pieces which are substantially 180 electrical degrees apart form pairs of pole pieces of opposite polarity. The field exciting windings 31 and 33 are connected in series and across a substantially constant potential source of electrical power supply, such as an electrical battery 34. The field exciting windings 30 and 32 also are connected in series and across the substantially constant potential battery 34 and in series with a high resistance 35. These field exciting windings 30 and 32 may be connected directly across the battery 34 by closing the contacts 36 and 37 of a shunting switch connected across the resistance 35.

Under certain predetermined load conditions, such as under light load and low speed conditions, the contacts 36 and 37 of the shunting switch are closed and all of the field exciting windings 30, 31, 32, and 33 are fully energized so that all of the pole pieces are excited substantially to saturation and the voltage of the generator varies in accordance with its inherent characteristics as determined by the saturated portion of the generator magnetization curve. With certain types of prime movers the speed of the prime mover and, therefore, the speed of the generator, varies with the load on the generator, and the demagnetizing component of the armature reaction of the generator also varies with load variations. Both of these effects tend to produce variations in the terminal voltage of the generator, and in order to maintain this voltage within a predetermined range and yet obtain a stable operation of the machine it is desirable that the magnetic field exciting system should remain substantially saturated. In order to maintain a substantially saturated magnetic field excitation system and to maintain the generator voltage within a predetermined range, the pole pieces per pole which are excited substantially to saturation are varied uniformly in accordance with predetermined operating conditions of the generator. To obtain this result, the field exciting windings 30 and 32 may be connected in series with the high resistance 35 by opening the contacts 36 and 37 of the shunting switch, and these windings are thereby substantially deenergized when the speed of the generator is substantially increased. This, however, has substantially no effect upon the excitation of the pole pieces 26 and 28, which remain substantially saturated by the normal energization of the field exciting windings 31 and 33, respectively. The two sets of field exciting windings 30 and 32, and 31 and 33, are constructed so that the voltage of the generator can be maintained within a desired predetermined range under the different operating conditions. Furthermore, the desired voltage limits when the excitation is provided by both sets of field exciting windings and when the excitation is provided by only one set of field exciting windings may be maintained substantially the same for both conditions, or any desired predetermined relative voltages for the different operating conditions may be obtained by varying the relative excitation provided by the two sets of pole pieces.

While I have illustrated and described different embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. An electric generator having a magnetic field structure including a plurality of pole pieces, field exciting windings for said pole pieces, means for energizing said field exciting windings arranged to provide substantially magnetically saturated pole pieces, and means operable in accordance with predetermined operating conditions for connecting said field exciting windings to said energizing means and for varying the pole pieces substantially excited to saturation.

2. An electric generator, a magnetic field structure for said generator including a plurality of pairs of pole pieces, field exciting windings for said pole pieces, means for energizing said field exciting windings arranged to provide substantially magnetically saturated pole pieces, and means operable in accordance with predetermined operating conditions for connecting said field exciting windings to said energizing means and for varying the pairs of pole pieces substantially excited to saturation.

3. An electric generator, magnetic field structure for said generator having a plurality of poles, each of said poles including a plurality of pole pieces, field exciting windings for said pole pieces, means for energizing said field exciting windings arranged to provide substantially magnetically saturated pole pieces, and means operable in accordance with predetermined operating conditions for connecting said field exciting windings to said energizing means and for varying the pole pieces per pole substantially excited to saturation.

4. An electric generator, a magnetic field structure for said generator including a plurality of poles, each of said poles including a plurality of longitudinally spaced-apart pole pieces, field exciting windings for said pole pieces, means for energizing said field exciting windings arranged to provide substantially magnetically saturated pole pieces, and means operable in accordance with predetermined operating conditions for connecting said field exciting windings to said energizing means and for varying the pole pieces per pole substantially excited to saturation.

5. An electric generator adapted to operate at widely varying speeds, a magnetic field structure for said generator including a plurality of poles, each of said poles including a plurality of longitudinally spaced-apart pole pieces, field exciting windings for said pole pieces, means for energizing said field exciting windings arranged to provide substantially magnetically saturated pole pieces, and means operable in accordance with predetermined operating speeds of said generator for connecting said field exciting windings to said energizing means and for varying uniformly the pole pieces per pole substantially excited to saturation.

6. An electric generator, a magnetic field structure for said generator including a plurality of circumferentially spaced-apart pole pieces, field exciting windings for said pole pieces arranged to provide pairs of pole pieces including poles of opposite polarity arranged substantially 180 electrical degrees apart, means for energizing said field exciting windings arranged to provide substantially magnetically saturated pole pieces, and means operable in accordance with predetermined operating conditions for connecting said field exciting windings to said energizing means and for varying said pairs of pole pieces substantially excited to saturation.

JOHANN GRÜNSCHNEDER.